Aug. 26, 1958  L. R. O'NEILL  2,848,816
GLASS SHEET GAUGE
Filed June 23, 1955  2 Sheets-Sheet 1
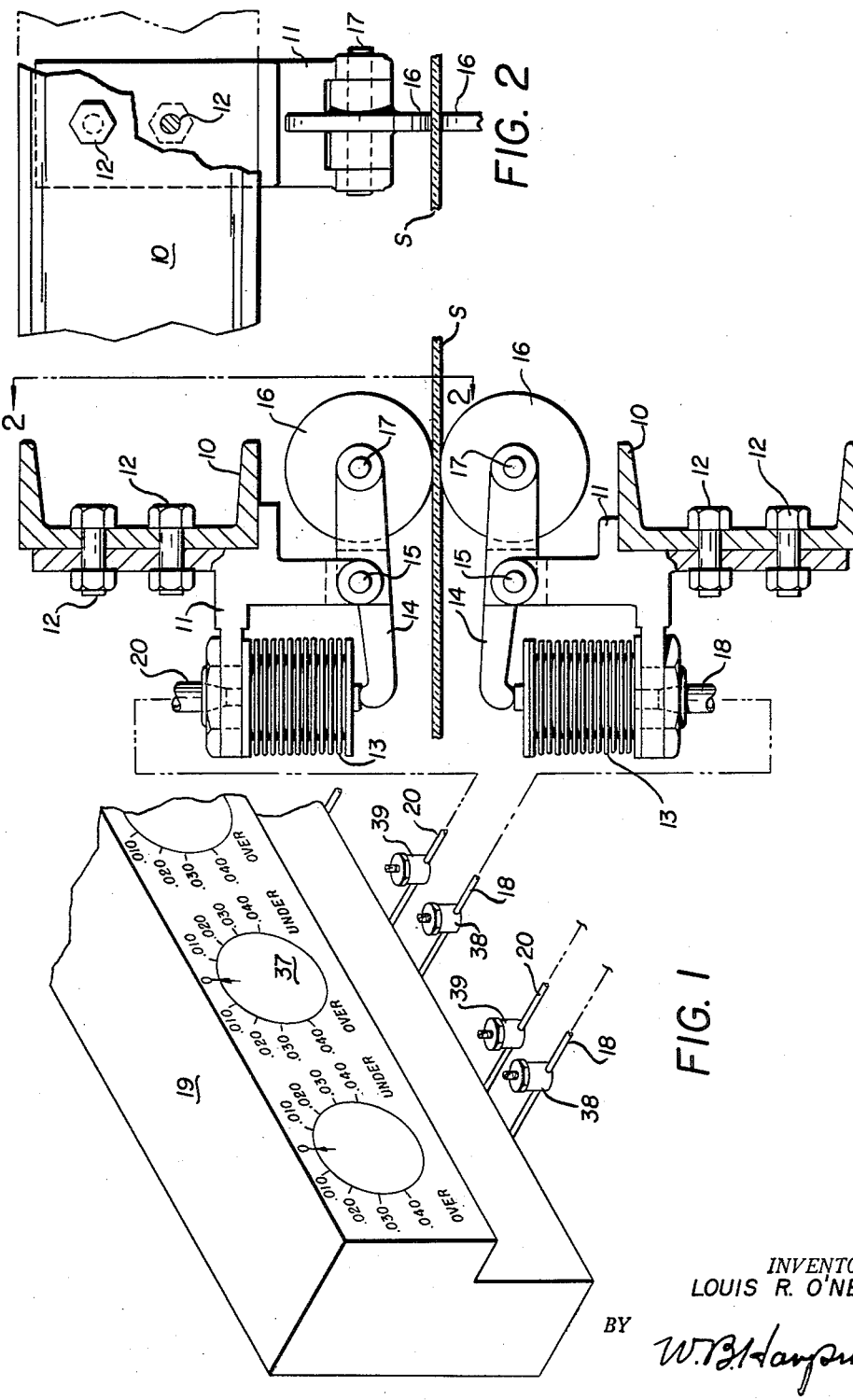
INVENTOR.
LOUIS R. O'NEILL
BY
W. B. Harpman
ATTORNEY Aug. 26, 1958    L. R. O'NEILL    2,848,816
GLASS SHEET GAUGE
Filed June 23, 1955    2 Sheets-Sheet 2
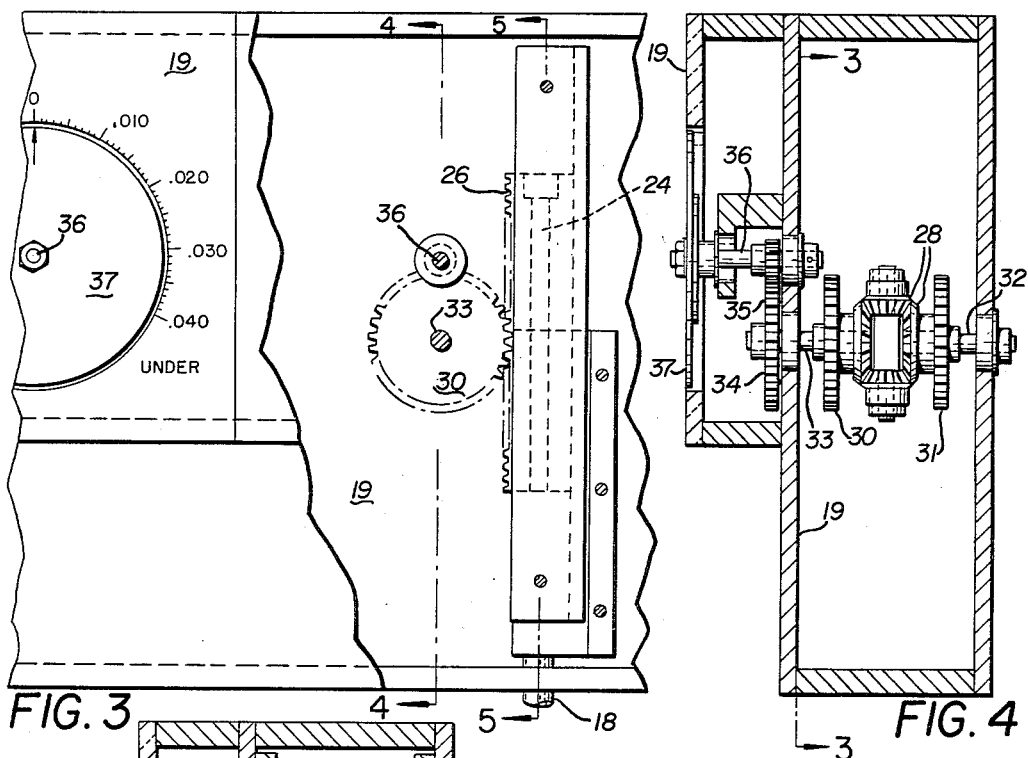
FIG. 3
FIG. 4
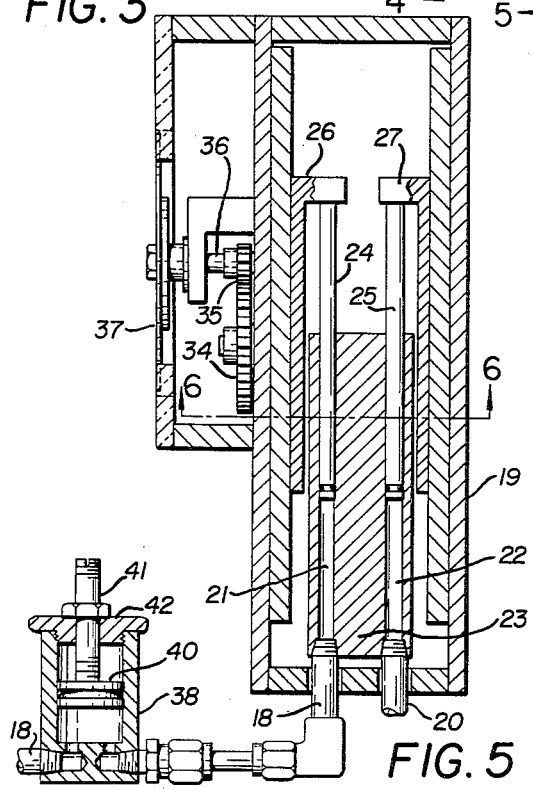
FIG. 5
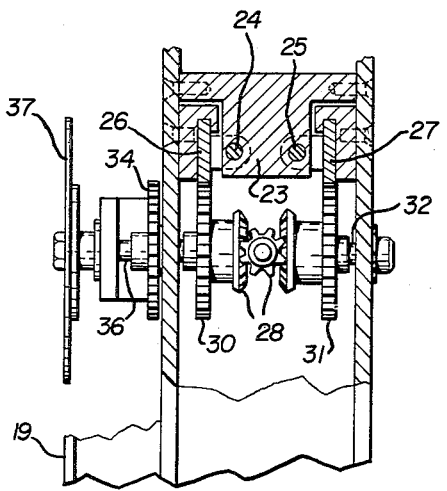
FIG. 6
INVENTOR.
LOUIS R. O'NEILL
BY
W. B. Harpman
ATTORNEY

United States Patent Office 2,848,816
Patented Aug. 26, 1958

2,848,816

GLASS SHEET GAUGE

Louis R. O'Neill, Shinnston, W. Va.

Application June 23, 1955, Serial No. 517,557

2 Claims. (Cl. 33—148)

This invention relates to a gauge for continuously indicating the thickness of a sheet of glass as the same is formed.

The principal object of the invention is the provision of a gauge for continuously indicating the thickness of a glass sheet as it is drawn.

A further object of the invention is the provision of a gauge of which multiple units may be mounted in a lehr to continuously indicate the thickness of a sheet of glass being drawn through the lehr at a multiplicity of points across the width of the glass sheet.

A still further object of the invention is the provision of a glass sheet gauge indicator that will indicate variations in thickness of the glass sheet being drawn at such times as the sheet is flat and at such times as the sheet is wavy.

A still further object of the invention is the provision of a glass sheet gauge for indicating variations from a desired thickness and capable of gauging glass sheets of different thicknesses.

A still further object of the invention is the provision of a glass sheet gauge that may be installed in the lehr immediately behind the cutting point whether the sheet is moving vertically or horizontally and is also capable of being installed in the lehr at the 1000 degree point to constantly measure the gauge of the sheet at as many points across its width as are desired and indicating the thickness on graduated dials as variations from the normal thickness.

In the production of sheet and plate glass, the sheet is drawn vertically upwardly from the tank. In some cases its upward movement is continued through a vertical lehr and the glass cut into sheets. In others, it is passed over a horizontal bending roll while the glass is quite plastic and is moved forward in a horizontal plane. Sheet and plate glass is thus made in various thicknesses and in widths as great as ten feet.

It is well known that the gauge (that is, the thickness) of the sheet varies across the width of the sheet as well as along its length as the sheet is drawn. It is desirable to have a means of evaluating such variations continuously, making them visible and accurate so that operators may keep them at a minimum value.

The glass not only varies in gauge, it is not perfectly flat on either side. The actual thickness of the glass must be indicated even though the sheet is wavy.

The present practice is to cut a piece from the sheet at the end of the lehr where the glass is cool enough to handle and to caliper it manually with a micrometer.

Since the glass travels continuously, a considerable wastage results when calipering, as currently done, reveals gauge (thickness) irregularities. For example, in some glass forming machines as much as 140 feet of the glass sheet may exist between the bending roll and the point at which a sample can be cut and calipered. The temperature of the glass is in the neighborhood of 1600 degrees after it has passed the bending roll and assumes a horizontal plane. A little distance further, a temperature of only 1000 degrees exists and the glass is sufficiently set at this time to permit the use of the sheet gauge disclosed herein.

Thus, variations in the gauge of the glass may be determined at a relatively early time and the necessary corrections made whereby considerable wastage of the glass and the time to produce the same are avoided.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the function and scope of the invention.

The invention is illustrated in the accompanying drawing, wherein:

Figure 1 is a composite view partly in perspective and partly in side elevation illustrating one form of the invention.

Figure 2 is a vertical section taken on line 2—2 of Figure 1.

Figure 3 is an enlarged detail of a portion of the device illustrated in Figure 1 and with parts broken away.

Figure 4 is a vertical section taken on line 4—4 of Figure 3.

Figure 5 is a vertical section taken on line 5—5 of Figure 3.

Figure 6 is a horizontal section taken on line 6—6 of Figure 5.

By referring to the drawings and Figures 1 and 2 in particular it will be seen that in one form of the invention bellows are used for originating variations in fluid pressure which are conducted to indicator means.

The belows design disclosed in Figure 1 of the drawings is suited to any relatively thin sheet of glass. It will be observed that the bellows function not only as a cylinder but also as a spring.

Rigid members such as steel channels 10—10 are mounted in the lehr on each side of the sheet S. Brackets 11 are mounted on the channels 10 by fasteners 12. Each of the brackets 11 supports a bellows 13 and a lever 14, the lever 14 being pivoted by a pin 15 to the bracket 11. Each of the levers 14 is engaged at one end on the bellows 13 and carries a rotatable roller 16 on its other end by means of an axle 17. A plurality of brackets 11 are positioned on each of the channels 10 across the width of the glass sheet S to be gauged so that a plurality of oppositely disposed pairs of rollers 16 engage opposite adjacent surfaces of the glass sheet S.

The bellows 13 are arranged to be initially compressed so that thicker portions of the glass sheet S will move the rollers 16 apart and hence increase the length within the bellows 13 and vice versa. Each of the bellows on one side of the glass sheet S is in communication with a tube 18 which leads to a calibrating mechanism in a housing 19 while each of the bellows on the opposite side of the glass sheet S is in communication with a tube 20 which also leads to the calibrating and indicating mechanism in the housing 19.

It will thus be seen that as many opposed pairs of rollers and bellows may be used as desired across the width of the glass sheet and that each pair of rollers will transmit to its pair of bellows all variations in sheet thickness following all deviations from the normal plane of the glass and that each pair will function independently of the others.

Variations in thickness in the glass sheet result in changing the length of the bellows 13. A thin sheet shortens them and a thick sheet makes them longer. The sum of the changes in length in each pair is an accurate expression of variation of glass thickness.

Each of the bellows 13 and the tubes 18 and 20 are filled with a liquid such as glycol by means of which variations are transmitted from the point of contact with the glass sheet to the calibrating and indicating mechanism in the housing 19.

By referring now to Figures 3, 4, 5 and 6 of the drawings, the calibrating and indicating mechanism may be seen and it will be understood that the tubes 18 and 20 communicate with the mechanism disclosed in Figures 3, 4, 5 and 6 of the drawings and more particularly with a pair of cylinders 21 and 22 formed in a cylinder block 23 disposed within the housing 19 and receiving pistons 24 and 25 reciprocally, each of which in turn is attached to geared racks 26 and 27. Thus, variations in the bellows 13 result in motion of the geared racks 26 and 27.

The housing 19 supports a differential including small bevel gears 28 and pinions 30 and 31 by means of shafts 32 and 33. The pinions 30 and 31 are engaged with the geared racks 26 and 27. The shaft 33 is geared by means of gears 34 and 35 to a shaft 36 which carries an indicator dial 37. The motion of the geared racks 26 and 27 is thus imparted to the differential through the pinions 30 and 31 and the motion imparted by the differential to the shaft 33 through the gears 34 and 35 to the shaft 36 and the dial 37 represents the translation of the variations in thickness of the glass sheet S engaged by the rolls 16.

Means for setting the apparatus is included and comprises secondary cylinders 38 and 39 disposed one in each of the tubes 18 and 20. Each of the cylinders 38 and 39 have pistons 40 therein with threaded piston rods 41 extending outwardly through threaded piston heads 42 and whereby the relative positioning of the piston 40 in the cylinder 38 may be adjusted and which adjustment will increase or decrease the amount of motion transmitting fluid in the respective tube 18 or 20, as the case may be.

The dial 37 may thus be set to zero when the space between the rolls 16 corresponds exactly with the desired thickness of the glass sheet S and variations in the thickness of the glass sheet S from that setting will cause the dial 37 to move to over or under indicia as disclosed in Figure 1 of the drawings.

It will thus be seen that the several objects of the invention are met by the glass sheet gauge disclosed herein.

Having thus described my invention, what I claim is:

1. A glass sheet gauge comprising stationary support members positioned on either side of a glass sheet to be gauged, a plurality of brackets secured to each of said support members and spaced longitudinally thereon and transversely of said glass sheet to be gauged, levers pivoted to said brackets, rollers journaled one on the end of each of said levers, said brackets, said levers and rollers arranged in oppositely disposed pairs engaging the opposite surfaces of the glass sheet to be gauged, and means urging each of said levers and rollers toward said glass sheet, bellows mounted on said brackets in engagement with said levers for compression thereby when said rollers move toward one another, an indicator, fluid pressure lines communicating with said bellows and with piston and cylinder assemblies in said indicator, racks secured to the pistons of said piston and cylinder assemblies and movable thereby, axially aligned shafts positioned adjacent said racks in said indicator, pinions on said shafts engaged on said racks for rotation thereby and bevel gear differential mechanisms joining said shafts, dials in said indicator, one on each of said shafts.

2. The glass sheet gauge set forth in claim 1 and wherein secondary piston and cylinder assemblies are in communication with said fluid pressure lines, the pistons of said secondary piston and cylinder assemblies being securable in fixed relation to said cylinders and acting to vary the volume of fluid pressure in said lines, bellows and piston and cylinder assemblies to vary the position of said dials.

References Cited in the file of this patent

UNITED STATES PATENTS

| | | |
|---|---|---|
| 1,606,333 | Averill | Nov. 9, 1926 |
| 1,801,270 | Gray et al. | Apr. 21, 1931 |
| 1,864,876 | Westrum | June 28, 1932 |
| 1,889,089 | De Giers | Nov. 29, 1932 |
| 2,313,156 | Kratt | Mar. 9, 1943 |
| 2,372,595 | Maxon | Mar. 27, 1945 |
| 2,399,305 | Agnew et al. | Apr. 30, 1946 |

FOREIGN PATENTS

| | | |
|---|---|---|
| 462,250 | France | Mar. 18, 1913 |
| 614,642 | Great Britain | Dec. 20, 1948 |
| 1,071,595 | France | Mar. 3, 1954 |